Nov. 11, 1969          O. H. GRISWOLD ET AL          3,477,691
                        SPHERICAL PLUG VALVE
Filed March 25, 1966                              2 Sheets-Sheet 1

INVENTORS

Nov. 11, 1969     O. H. GRISWOLD ET AL     3,477,691

SPHERICAL PLUG VALVE

Filed March 25, 1966     2 Sheets-Sheet 2

INVENTORS
Owen H. Griswold
Richard E. Hitchcock 3,477,691
SPHERICAL PLUG VALVE
Owen H. Griswold, 681 Beechwood Drive, Westwood, N.J. 07675, and Richard E. Hitchcock, 67 Mill Glen Road, Upper Saddle River, N.J. 07458
Filed Mar. 25, 1966, Ser. No. 538,479
Int. Cl. F16k 25/00, 51/00
U.S. Cl. 251—172     10 Claims

ABSTRACT OF THE DISCLOSURE

A spherical plug valve, for controlling the flow of fluids, having one or more valve seals which seal and support the spherical plug in a diaphragm like manner and a construction that permits the fluid conduit connections to be placed in a choice of positions. The valve operating stem is directly and externally removable. The operating lever can be installed in a choice of positions to provide a visible indication of the open or closed condition of the internal flow path.

---

This invention relates to spherical plug valves, often referred to as ball valves.

Sperical plug valves have been known and utilized for many years, however adequate sealing of the plug or ball has constantly remained a problem. This has particularly been accentuated by the user's progressive increase in operating pressures. Pressures of several thousand pounds per square inch are commonly being applied at present with continued increases in valve operating pressures indicated for the future. Increased operating pressure contributes to higher operating loads so that the required operating force or torque is also an attendant problem.

It is a broad object of this invention to provide a plug valve that will seal at both high and low pressures, will require low operating force, will be simple in design and construction, thereby being inexpensive to manufacture, and durable in its performance with its wearing or normally replaceable parts readily accessible for replacement.

The primary object of this invention is a spherical plug valve having seals which will withstand fluid pressures in the magnitude of several thousand pounds per square inch. Plastic seals are desirable and specifically those made of fluorocarbons, of which Teflon is an example, because they are chemically inert, remain flexible at very low temperatures, and will withstand comparatively high temperatures. However, a concentrated load will cause Teflon and certain of the other plastics to "cold-flow," or displace itself, moving from the highly stressed location to a location of lower stress. The plastic is not resilient under this condition and the deformation becomes permanent. In most ball valves this stress concentration occurs between the ball and the seat used to support the plastic seal. In this valve the loads are uniformly distributed over a seal area approximately seven times the area of the ball contact and thereby the unit stress on the seal is only about fifteen percent as great as it would be if this same load was applied to the ball contact area only. Thus uniform loading of a maximum area of the seal minimizes the cold-flow and together with the reduction of unit stresses permits high fluid pressures without permanent deformation and resultant fluid leakage.

Another object is the provision of a double-acting seal. Double-acting being here defined as the ability of a single seal to withstand fluid pressure applied to either side of said seal. Thus a valve having only one double-acting seal is equivalent in performance to valves having two seals which are single-acting or unidirectional.

In a valve having two such double-acting seals added sealing reliability is thereby provided. Also, in valves with two seals, the center body is not normally subjected to pressure, thus the center body can be drained or "bled," the operating stem seal life is extended and operating torque is reduced. This double-acting seal can also be utilized in a valve having more than one path of fluid flow in which instance two or more such seals are present, understanding that it is not the intent here to limit or exhaustively describe all possible arrangements of such flow paths or combination of conduit connections or parts.

Another object is to provide a valve having a diaphragm type of seal, said seal restrained at its periphery and which is free to move axially at the inner diameter where it contacts the ball. This provides dynamic or pressure loading of the seal to the ball to maintain sealing pressure proportional to the applied fluid pressure.

Another object is to provide a valve having a resilient means, exclusive of the seal, to maintain the seal in contact with the ball under all conditions by compensating for wear, ball movement, and dimensional variations due to temperature changes and manufacturing tolerances.

Another object is to provide a ball valve having a valve center body and two separate end caps, the center body to be readily removable when the valve has been installed so that replacement of any or all of the wearing parts may be made without complete valve removal or disconnecting of the attendant piping or fluid conduits. This is unique in that there are no pilots or other projections required between the valve body and the end caps as are in other valves. Therefore, with the valve in the open condition, the center body can be withdrawn without separating said end caps axially. The end caps to be provided with a selection of the various types of fluid conduit connections.

Still another object is to provide a valve having a cap which retains the operating stem by bearing on the end of said stem. Said cap to have one or more openings to receive the operating lever, thus no retaining shoulder is required on the stem. Eliminating the retaining shoulder on the stem and the attendant retaining means surrounding it in the valve body makes possible a thinner valve body. This thereby reduces the overall length of the valve while the simplicity makes for less expensive construction. Still further, the edges of the cap openings act as stops for the operating lever, thereby eliminating the need for a separate stop plate.

Still another object is a universal operating lever or handle consisting of a rod and a knob, attached to one another. The rod is inserted in a hole diametrically through the stem and is secured by a set-screw therein. This provides quick removal of the handle or allows adjustment to various desired positions. It also enables handles of various lengths to be readily and inexpensively made and installed.

Other objects and advantages of this invention will be apparent from a study of the following description and claims. The accompanying drawings, in which like numerals are used to designate the like parts throughout, are a part of this specification; wherein:

Figure 1:
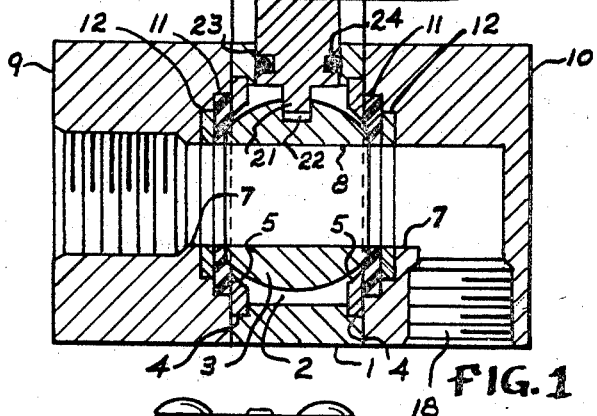
FIG. 1 is a sectional view through a valve having two seals.
Figure 4:
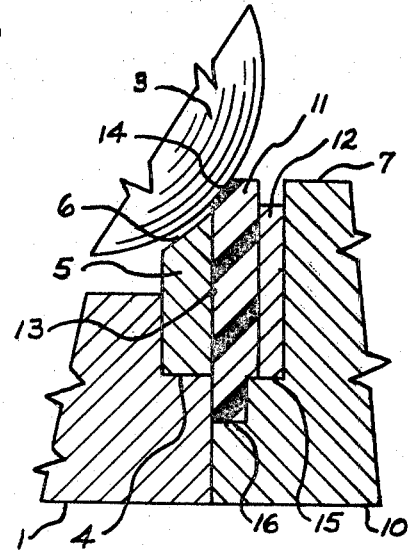

FIG. 4 is an enlarged partial view from FIG. 1 showing a back-up ring 5, a seal 11, a Belleville spring washer 12 and a partial portion of the ball 3.

Figure 5:
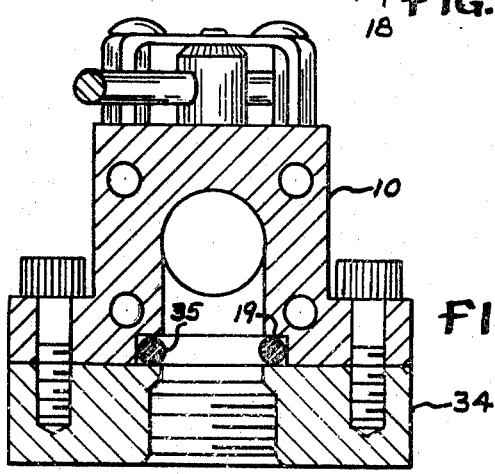

FIG. 5 is a view of a typical valve of this invention with the end caps arranged for manifold or base plate installation.

Referring particularly to FIGS. 1 and 4 of the drawings, the valve body 1 has a cylindrical bore 2 somewhat larger than the outer diameter of the ball 3. The ball 3 has a bore 8 which serves as the flow passage therein and which is concentric with bore 7 in each end cap, 9 and 10. The ball 3 is rotatable and is shown in the open position, thereby providing a continuous flow path through the valve. When the ball is rotated 90 deg. to the position shown the flow path is blocked and the valve is then in its closed position, as is familiar to the art. Each end of bore 2 in body 1 is recessed at 4 to accept the annular back-up ring 5. Said ring 5 having a conical inner surface 6 which is tangent to the surface of ball 3 at the innermost diameter of said ring. The smallest practical clearance is left between ball 3 and back-up ring 5 to allow the ball to rotate freely but is sufficiently small to prevent the seal 11 from extruding through the said clearance.

The double-acting seal 11 as best shown in FIG. 4, has a substantially flat washer-like geometry with a spherically formed seat at 14 where it contacts the surface of ball 3. The seal 11 is located in the annular cavity 16 of end cap 10 and is held tightly clamped between end cap 10 and the valve body 1 by the four screws 17, thereby sealing the valve body 1 to end cap 10. Seal 11 is thereby only retained at its periphery and is free to move axially at its inner diameter 14 in a diaphragm-like action. When a valve has two such seals 11, as shown in FIG. 1, then one such seal is placed in end cap 10 as above described and the other seal 11 is placed in a similar manner in end cap 9. A resilient means, such as the Belleville spring washer 12, is located in the annular cavity 15 in the end cap 10 and in a like manner in end cap 9. Said resilient means assures that the seal 11 remains in contact with the ball 3 when any dimensional changes may occur in the direction transverse to the major plane of the seal 11. This said resilient means will compensate for relative ball movement caused by applied fluid pressure and for normal seal wear, and also for dimensional variations, due to manufacturing tolerances and temperature changes.

The action of the double-acting seal in a valve having two seals is as follows:

Referring to FIG. 1 and its enlarged section FIG. 4 fluid pressure is introduced through the supply connection in the end cap 10 and thence through opening 7 where it acts against the surface of seal 11 on the side opposite from that denoted as 13 and also on its exposed inner diameter. Thereby the seal 11 is held against the ball 3 at the sealing area 14 with a force which is proportional to the applied fluid pressure. This so called "dynamic" sealing action provided by the above described action of the diaphragm type seal 11 results in improved sealing ability as the pressure difference from one fluid conduit connection of the valve to the opposite or other connection increases. Under this condition of applied pressure the seal 11 is supported over its entire surface 13 as well as at the sealing contact surface 14 to react the applied fluid pressure. Thus when the pressure is applied in this direction the forces thereby created are uniformly distributed over the entire seal area to eliminate the tendency of the seal to "cold-flow" or to permanently deform.

Simultaneously the force caused by the applied fluid pressure acting on the exposed area of ball 3 and the force on the sealing area 14 cause the ball 3 to move in the direction of these forces and toward the end cap 9. Thus the seal 11 in end cap 9 is displaced or moved in a diaphragm-like action while at the same time displacing the adjacent Belleville spring 12 into contact with the face of the annular cavity 15. The movement or travel of ball 3 brings it in contact with the conical surface 6 of back-up ring 5. Any further increase in the forces is now transmitted to the back-up ring 5 and thereby uniformly distributed over the relatively large area 13 as well as sealing surface 14 of the seal 11. Forces are reacted on the opposite face of seal 11 by the face of the Belleville spring 12 which in turn has its load reacted by the structure of the end cap 9. Thus the forces resulting from the applied fluid pressure are exposed to and reacted over large areas of the seal 11 thereby eliminating any areas of concentrated stress in seal 11, and hence minimizing cold-flow or permanent seal deformation. In addition to eliminating stress concentrations the distribution of the forces over large areas reduces the unit stress to approximately 15% of the stress that would occur if the forces were applied entirely and solely to a seat at the ball sealing area 14. If pressure is reversed, that is applied to the end cap 9, seal action is the same except in the reversed direction.

Figure 6:
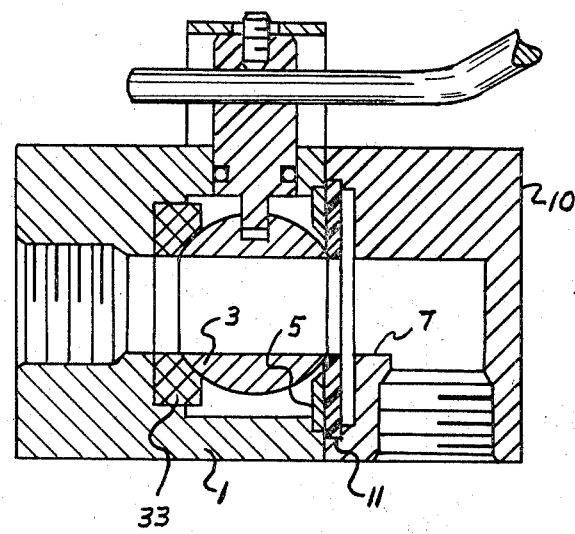
Figure 7:
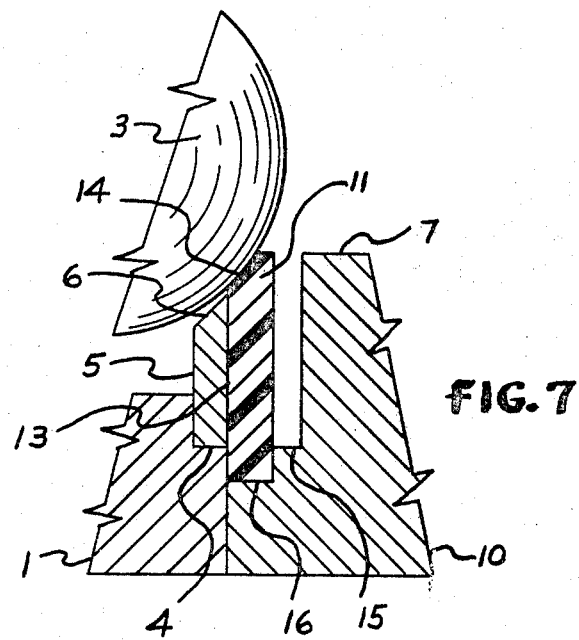

Referring to FIG. 6 and its enlarged section FIG. 7, the valve is shown with the omission of a separate resilient means, such as the Belleville spring washer 12 as shown in FIG. 1 and FIG. 4. When seal 11 is made from certain materials, such seal, in itself, possesses adequate resiliency so as to provide proper diaphragm like sealing action, therefore a separate resilient means is not required. The sealing action is identical to that as previously described for FIG. 1 and FIG. 4 except that when the separate resilient means is omitted, the reaction to the fluid pressure force is through seal 11 which then directly bears upon the structure of the end cap 10.

Referring again to FIG. 6, only one sealing washer is required and when only one such sealing washer is used, a bearing washer 33 is installed on the opposite side of the spherical plug 3 to provide support and restraint for the spherical plug. When using only one sealing washer 11 and one bearing washer 33, the end piece containing this bearing washer can be made integral with and a part of the valve body.

When the direction of the fluid pressure is reversed the action of the seal is again like that of the two seal valve except that the fluid pressure imposes an additional force to the face 13 of seal 11. However, this force is uniformly distributed over said face 13 resulting in low unit stresses since the force is distributed over a large area. Therefore, as in the two seal valve there are no stress concentrations to cause seal cold-flow or permanent seal deformation.

Referring again to FIG. 2 the four screws 17 which pass from one end cap 9 through holes 32 in the valve body 1 and are threaded into the opposite end cap 10 as shown, illustrates a typical means of assembly. Alternate assembly means can be used, such as said holes being drilled completely through both end caps 9 and 10 and valve body 1 and through which are placed threaded rods upon which nuts are then secured on the exterior of the said end caps to tightly clamp into proper assembly these several pieces. Such an assembly permits the valve body 1 and its contained parts to be removed for servicing, or for any other purpose, without disturbing, disconnecting or removing the fluid conduit from the end caps. Nor is it necessary to separate the end caps to withdraw the valve body 1, since there are no projections on said body to interfere with the end caps. With the valve body 1 so removed, replacement of the seals and other parts can readily be made.

Another advantage of this design is that the end caps may be made to serve as an elbow fitting, as shown in end cap 10 where the conduit connection 18 is at a right angle to the flow passage through the valve body 1. If the above mentioned four screws 17, or any alternate means of assembly are symetrically located, so as to allow the end caps to be properly assembled to said valve body in any of several positions, then each end cap can be positioned in assembly so as to assume its preferred position with respect to its contained conduit connection as related in position to the valve body and the opposite or other end caps. Four positions are illustrated in these drawings, with each of these said positions at right angles to one another. Another advantage is shown in FIG. 5 where the threaded connection 18 is replaced by a recess or counterbore 19 of proper proportions so as to be sealed against a mating flat surface, such as a manifold plate 34, using an O-ring gasket or other suitable sealing means, 35.

The ball 3 is rotated by the stem 20 by means of the tongue 21 which engages the slot 22 in ball 3. The slot 22 being at right angles to the bore and flow passage of ball 3, thus the ball may move axially within the chamber 2 of valve body 1 when the valve is in its closed position. An O-ring or other suitable seal 24 located in an annular groove in stem 20 seals the stem to the stem bore 23 of the valve body 1 in a conventional manner. Thus the ball 3 can be rotated by external action as is common practice for all spherical plug valves.

Figure 2:
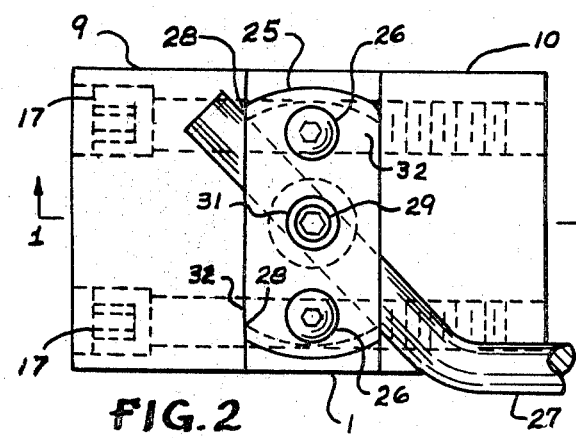
FIG. 2 is a plan view of the valve in FIG. 1.
Figure 3:
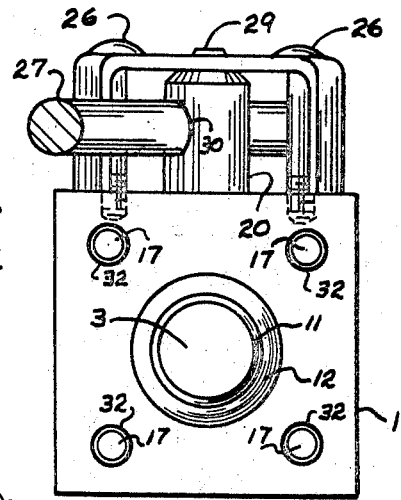
FIG. 3 is an end elevation view of FIG. 2 with the end cap 10 removed to show the relative positions of a seal and a Belleville spring washer.

The tongue 21 of the stem 20 is maintained in driving relation with slot 22 in ball 3 by a cap 25 which is attached to the body 1. In FIG. 2 and FIG. 3 two screws 26 are shown as said attaching means. Cap 25 serves a further purpose in that it is so proportioned that the edges 28 act as stops to limit the travel of the operating lever 27. The stem 20 has a hole 30 therethrough located at 45 degrees to the tongue 20 to receive the lever 27 which is secured by a set-screw 29 located in the end of the stem 20, said set screw being accessible through a hole 31 in the cap 25. This arrangement permits the lever to be easily and quickly positioned or removed without disturbing the valve or the stem. This is desirable when the valve is installed on a panel and also for compactness in packaging. Further, such stem and lever design provides an external indication of internal flow path position.

Since the lever shown as a part of this invention consists of a rod with the indicated contour and threaded on one end to accommodate a knob 33, handles of varying lengths and shapes may readily and inexpensively be made with little required tooling. Varying the handle length permits use of the optimum required operating force at the knob with various fluid operating pressures. Also it can allow acceptable installation where space is restricted. Further, coding of the function or use of said valve can easily be made by utilizing balls of various colors for the knob 33. Removal of the screws 26 and cap 25 permits the stem 20 to be readily removed for servicing or replacement of the seal 24 without further disassembly of the valve.

Having thus described our invention, we claim:

1. A spherical plug valve having a valve body with a valve chamber therethrough having an outwardly facing annular recess in each end of said valve chamber, a ring of suitable material received in each said annular recess, each said ring having a frusto-conically formed inner surface with its smaller diametered portion outward away from said valve chamber, a spherical valve plug rotatably and operatively mounted in said valve chamber between said rings with the surface of said plug directly exposed to the conical surface of said rings, an end piece having a fluid passageway therein, said end piece having an annular recess facing towards said spherical valve plug, the side walls of said recess being formed by two portions of different diameter separated by a flat shoulder facing towards said spherical valve plug, an annular resilient member in the smaller diametered portion of the recess, a diaphragm like annular sealing washer in the larger diameter portion of said recess, said annular sealing washer extending inwardly so as to overlie said annular resilient member, said sealing washer being clamped by said flat shoulder and sealing thereto and being clamped against an outer face of at least one of said valve body and said ring, said sealing washer extending radially inwardly into contact with said spherical plug.

2. The spherical plug valve of claim 1 characterized in that said ring has said frusto-conically formed inner surface of such proportions so that the smaller diametered portion is closer to said spherical valve plug than the larger diametered portion and the plane in which said inner surface lies is essentially geometrically tangent to the surface of said spherical valve plug.

3. The sphehical plug valve of claim 1 characterized in that the said sealing washer bears directly against said ring and said spherical valve plug when fluid pressure is applied to said valve through the end piece containing said sealing washer and the forces created by the fluid pressure will thereby be uniformly distributed over the entire exposed surface of said sealing washer, thus preventing permanent deformation of said sealing washer which would otherwise occur if said sealing washers were not so supported.

4. The spherical plug valve of claim 1 characterized in that a Belleville spring washer; having a frusto-conical shape and serving as the said annular resilient member, is placed in said smaller diametered portion of said annular recess with the smaller diametered portion of said Belleville spring washer inward towards said sealing washer.

5. The spherical plug valve of claim 1 characterized in that the annular sealing washer shall be a flat washer having its outer diameter, inner diameter and thickness of proper geometrical proportion so as to provide proper flexibility to accomplish its diaphragm like sealing action.

6. The spherical plug valve of claim 1 characterized in that each diaphragm like sealing washer will seal and support the spherical valve plug when fluid pressure is applied from the direction of either end piece.

7. The spherical plug valve of claim 1 characterized in that the diaphragm like sealing washer also serves to seal the surfaces of the valve body and the end piece at the locations where they come into direct contact, one with the other.

8. A spherical plug valve having a valve body with a valve chamber therethrough, a spherical valve plug rotatably and operatively mounted in said valve chamber and a transverse bore provided in said valve body into which is placed a round, rotatable operating stem, conventionally sealed to said bore, said stem to have a driving tongue on its inner end which engages in a slot in said spherical valve plug and said stem is held operatively in place by an external cap member fastened securely to said valve body and said cap member bears against the external end of said stem to retain said stem in said valve body, said stem having a round hole transverse to the axis of said stem, and a round operating lever disposed in said hole in said stem, said lever being retained in said stem by a retaining screw placed in the outer end of said stem, with access to said retaining screw provided by a hole placed in the top of said cap member.

9. The spherical plug valve of claim 8 characterized in that the cap member shall have a flat top surface and two sides, said sides providing four edges which are transverse to said top surface and parallel to the axis of said stem, said edges thereby providing a means of limiting the rotational movement of said lever.

10. The spherical plug valve of claim 9 characterized in that the said lever shall have a straight portion where said lever engages into said stem and at a point beyond where said lever makes contact with one of said edges said lever shall have an oblique bend with respect to said straight portion, thereby providing a means by which the position of the bore through the spherical plug with respect to the flow passages can be ascertained by observation of the position of said lever, thus the flow condition of said spherical plug can be indicated as being fully open when the bent portion of said lever is parallel to the longitudinal axis of said valve and can be indicated as being fully closed when the bent portion of said lever is transverse to said longitudinal axis.

References Cited

UNITED STATES PATENTS

| | | | |
|---|---|---|---|
| 2,520,288 | 8/1950 | Shand et al. | 251—174 |
| 2,741,138 | 4/1956 | Russell | 251—315 |

(Other references on following page)